United States Patent
Manson

(12) 
(10) Patent No.: US 6,248,689 B1
(45) Date of Patent: *Jun. 19, 2001

(54) SELF-REGENERATING DIESEL EXHAUST PARTICULATE FILTER AND MATERIAL

(75) Inventor: Ian Manson, Oakville (CA)

(73) Assignee: Redem Technologies, Inc., Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/480,467

(22) Filed: Jan. 10, 2000

Related U.S. Application Data

(63) Continuation of application No. 09/115,806, filed on Jul. 15, 1998, now Pat. No. 6,013,599.

(51) Int. Cl.$^7$ ................ B01J 23/40; B01J 23/58
(52) U.S. Cl. ........... 502/340; 502/325; 502/326; 502/328; 502/330; 502/331; 502/338; 502/339; 502/344; 502/345; 502/353
(58) Field of Search .............. 502/325, 326, 502/330, 331, 338, 339, 340, 344, 345, 353

(56) References Cited

U.S. PATENT DOCUMENTS

| | | |
|---|---|---|
| 3,957,691 | 5/1976 | Adachi et al. . |
| 4,503,162 | 3/1985 | Windawi et al. . |
| 4,510,265 | 4/1985 | Hartwig . |
| 4,515,758 | 5/1985 | Domesle et al. . |
| 4,711,870 | 12/1987 | Yamada et al. . |
| 4,759,918 | 7/1988 | Homeier et al. . |
| 5,000,929 | 3/1991 | Horiuchi et al. . |
| 5,183,401 | 2/1993 | Dalla Betta et al. . |
| 5,203,166 | 4/1993 | Miller . |
| 5,213,781 | 5/1993 | Abe et al. . |
| 5,248,251 | 9/1993 | Dalla Betta et al. . |
| 5,250,489 | 10/1993 | Dalla Betta et al. . |
| 5,258,348 | 11/1993 | Van Buren et al. . |
| 5,258,349 | 11/1993 | Dalla Betta et al. . |
| 5,259,754 | 11/1993 | Dalla Betta et al. . |
| 5,281,128 | 1/1994 | Dalla Betta et al. . |
| 5,294,411 | 3/1994 | Breuer et al. . |
| 5,326,253 | 7/1994 | Dalla Betta et al. . |
| 5,330,945 | 7/1994 | Beckmeyer et al. . |
| 5,340,548 | 8/1994 | Abe et al. . |
| 5,405,260 | 4/1995 | Dalla Beta et al. . |
| 6,013,599 | * 1/2000 | Manson ................ 502/340 |

FOREIGN PATENT DOCUMENTS

| | | |
|---|---|---|
| 37 29 691 | 4/1989 | (DE) . |
| 0 052 478 | 5/1982 | (EP) . |
| 0092023 | 10/1983 | (EP) . |
| 0160482 | 11/1985 | (EP) . |
| 0321451 | 6/1989 | (EP) . |
| 0508513 | 10/1992 | (EP) . |
| 0590814 | 4/1994 | (EP) . |
| 0600442 | 6/1994 | (EP) . |
| 0658369 | 6/1995 | (EP) . |
| 0703352 | 3/1996 | (EP) . |
| 0714692 | 6/1996 | (EP) . |
| 0743429 | 11/1996 | (EP) . |
| 0764455 | 3/1997 | (EP) . |

OTHER PUBLICATIONS

*McGraw–Hill Encyclopedia of Science & Technology*, 6th Edition, McGraw–Hill Book Company (1987): New York, N.Y., pp. 200–201. (No Month Available).

* cited by examiner

*Primary Examiner*—Elizabeth D. Wood
(74) *Attorney, Agent, or Firm*—Morrison & Foerster, LLP

(57) ABSTRACT

This is a self-regenerating catalyst member which may be used to remove particulate carbon and residual hydrocarbonaceous material from engine exhaust, especially those emanating from diesel engines. Specifically, the invention is an oxidation catalyst preferably placed onto a particulate trap or collector and placed in the exhaust circuit of a diesel engine. The catalytic material involved is specially formulated to form what are believed to be large particle, multimetal oxide-based catalytic particles. The catalytic particles may be perovskites. The catalytic materials of this invention include at least one member selected from Group IB metals, preferably copper, and at least one member selected from Group VIII metals, preferably iron, and compounds thereof and Group 5B metals, preferably vanadium or vanadium compounds. Optionally, one or more Platinum Group metals (Ru, Rh, Pd, Re, Os, and Pt) may be added if so desired. The specific method of preparing the active oxidation components of the composition is believed to provide the improved composition. The composition is long-lived and is self-regenerating at most diesel exhaust gas temperatures.

10 Claims, 6 Drawing Sheets

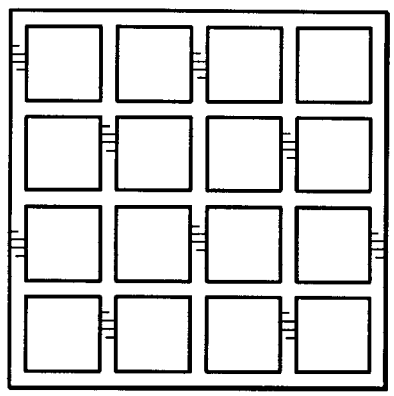
FIG. 2A
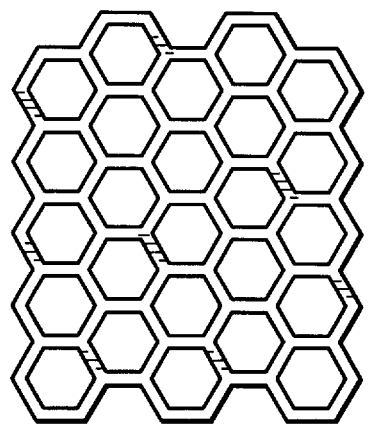
FIG. 2B
FIG. 2C
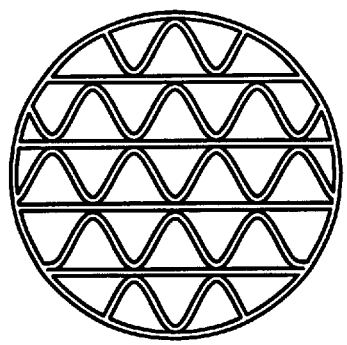
FIG. 2D
FIG. 2E
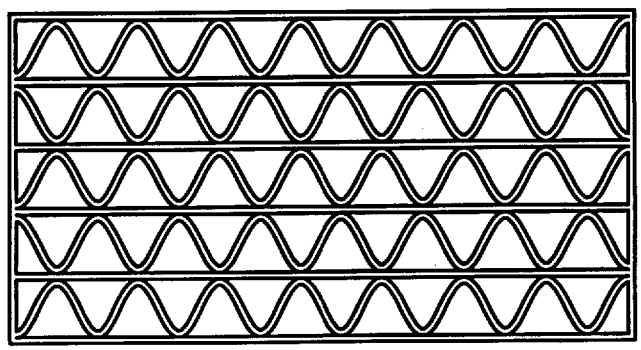

US 6,248,689 B1

SELF-REGENERATING DIESEL EXHAUST PARTICULATE FILTER AND MATERIAL

RELATED APPLICATIONS

This application is a Continuation of U.S. patent application Ser. No. 09/115,806, filed Jul. 15, 1998, now U.S. Pat. No. 6,013,599, the contents of which is hereby incorporated by reference into the present disclosure.

FIELD OF THE INVENTION

This invention relates to a self-regenerating catalyst member which may be used to remove particulate carbon and residual hydrocarbonaceous material from engine exhaust, especially those emanating from diesel engines. Specifically, the invention is an oxidation catalyst preferably placed onto a particulate trap or collector and placed in the exhaust circuit of a diesel engine. The catalytic material involved is specially formulated to form what are believed to be large particle, multi-metal oxide-based catalytic particles. The catalytic particles may be perovskites. The catalytic materials of this invention include at least one member selected from Group IB metals, preferably copper, and at least one member selected from Group VIII metals, preferably iron, and compounds thereof and Group 5B metals, preferably vanadium or vanadium compounds. Optionally, one or more Platinum Group metals (Ru, Rh, Pd, Re, Os, and Pt) may be added if so desired. The specific method of preparing the active oxidation components of the composition is believed to provide the improved composition. The composition is long-lived and is self-regenerating at most diesel exhaust gas temperatures.

BACKGROUND OF THE INVENTION

This invention deals with a self-regenerating particulate filter useful in removing carbonaceous particulates and related hydrocarbonaceous materials from engine exhaust, particularly diesel engine exhaust. I have found by a proper selection of catalytic materials and by the method of introducing the catalytic materials into the particulate trap, that the particulate trap is able to self regenerate for long periods of time. By "self-regeneration," I mean that upwards of 95% of the carbonaceous and heavy hydrocarbonaceous particulate material introduced into a properly sized particulate trap is oxidized at the exhaust gas temperature. This being the case, the particulate trap need not be removed and treated in a furnace to remove carbon from the trap.

Diesel engine exhaust are known to contain, in addition to visible carbonaceous particulates, carcinogenic substances such as benzopyrene and nitropyrene. Removal of these carcinogens and particulate material is an ongoing problem. Although diesel engine exhausts are considered to be clean, apart from the carbon and unburned hydrocarbon components, removal of such materials is not trivial.

As noted above, particulate filters for diesel engine exhausts are known. These particulate filters encompass a wide variety of forms. They may be particulate or reticulated ceramic foam. They may encompass honeycomb-like structures, often with blocked passageways and small openings between adjacent passageways. Metal mesh filters, pelletized refractory materials such as alumina, and ceramic fibrous mats are all used as diesel particulate filters.

Common to all of these structures is the fact that after a reasonably short period of time, they become clogged with the material they are intended to remove. Virtually each structure noted above must be removed and heated, perhaps in a furnace or the like, to burn off the accumulated carbon and hydrocarbon oils so to, in effect, regenerate the particulate collector for reuse. These regeneration steps are carried out variously on the vehicle or in a furnace or the like.

Typical of the on-vehicle regeneration device is one found in U.S. Pat. No. 5,203,166, to Miller. Miller describes an emissions control system to be installed on a diesel engine exhaust. It includes a particulate filter system and a pair of heaters. The heaters operate in such a way that one portion of the catalyzed particulate filter system is being regenerated while the rest is being used. Miller does not appear to describe the kind of catalyst which is used.

European Patent Application No. 0,321,451 also describes a diesel particulate oxidizer placed in an exhaust system. Of major interest in the '451 patent, however, is the control system used to regenerate the device. Although the support is said to be a ceramic foam, little else is said about the makeup of the catalyst.

Similarly, EPO 590,814 is, in the main, heavily involved with the procedures for regenerating and the device is used in monitoring and reviving the soot collection catalyst. The oxidation catalyst is said to be platinum, palladium, or a platinum-palladium alloy. No other catalyst type is mentioned.

European Patent Application No. 0,703,352 similarly is concerned with an emission control system rather than the oxidation catalyst itself. No specific catalyst is noted in the description of the invention.

European Patent Application No. 0,743,429 describes a diesel exhaust particulate filter which includes an oxidation catalyst. The oxidation step is controlled by the introduction of diesel fuel upstream of the oxidation catalyst and the fuel is burned to raise the temperature of the exhaust cast and hence the catalyst bed to burn away the particulate material found in the filter. Again, no specific type of catalyst is described.

Finally, European Patent Application No. 0,764,455 shows the use of a sintered fiber web as the device for removing carbon-based particles from the exhaust gas. The web may be treated to form an alumina film on the surface of the fibers and optionally a catalyst may be placed on those alumina-coated fibers. The catalytically active materials are described quite broadly as "at least one kind of metal selected from the group consisting of the metals of Group 1, Group 2, Group 3b, Group 4b, Group 5b, Group 6b, Group 7b, or Group 8 of the Periodical Table."

More important to this invention are the patents dealing with a specific oxidation catalyst useful for placement in diesel engine exhaust filters for oxidizing particulate materials found there.

U.S. Pat. No. 4,510,265, to Hartwig, describes a diesel engine exhaust gas catalyzed filter which is said to be self-cleaning. The active oxidation catalyst is said to be a combination platinum and silver vanadate material. The example shows removal of accumulated carbon by placement of the filter in a furnace variously at temperatures of just greater than 475° C. (for 20% burnoff) to just over 600° C. (for 80% burnoff).

U.S. Pat. No. 4,711,870, to Yamada et al., similarly shows a porous ceramic body used to oxidize diesel soot. The active catalyst is said to be one comprising: (a) copper or a copper compound; (b) vanadium or a vanadium compound; (c) zirconium, aluminum, nickel, iron, manganese, lanthanum, chromium, zinc, lead or cerium, or a compound thereof; and optionally, (d) platinum, rhodium, or palladium, or a compound thereof. These catalysts are also said to allow the particulate burning temperature to be lowered below that required prior to the date of the Yamada et al patent. The temperature for removing 90% of the soot found in a control sample of the catalyzed porous body is shown in example 12 to be in the neighborhood of 460 to 470° C. The conversion of sulfuir dioxide to sulfur trioxide was shown to be typically between 15 and 33%.

U.S. Pat. No. 4,759,918, to Homeier et al., shows a Platinum Group metal (platinum, palladium, or rhodium) as a catalytic soot removal device. Example 6 of the patent shows a diesel soot combustion efficiency of 95% at 400° C. by use of a platinum catalyst on a titania support.

U.S. Pat. No. 5,000,929, to Horiuchi et al., shows a similar catalyst for diesel soot removal made up of a support, typically of an inorganic refractory oxide, and having palladium and the oxide of at least one of praseodymium, neodymium, and samarium as components.

U.S. Pat. No. 5,213,781, to Abe et al., and its division, U.S. Pat. No. 5,340,548, describe a porous diesel engine exhaust filter also catalyzed. The active catalyst is said to be made up of an alkali metal, a copper metal, a vanadium element, and at least one rare earth element. The particulate matter is said to be oxidized at 400° C. using Abe et al's catalyzed ceramic filter.

U.S. Pat. No. 5,294,411, to Breuer et al., describes an electrically heated catalyst carrier body utilizing rhodium or platinum as the oxidizing catalyst.

U.S. Pat. No. 5,330,945, to Beckmeyer et al., shows a diesel fuel exhaust filter containing a zeolite-based wash coat material. The preferred Y-type zeolite is exchanged with a precious metal to form the active material.

European Patent Application No. 0,714,652, to ICT Company Ltd., shows a catalyst for treatment of diesel engine exhaust gas comprising a three-dimensional support structure coated with a platinum and/or a palladium carrying refractory inorganic oxide powder further containing a metal selected from the group consisting of tungsten, antimony, molybdenum, nickel, vanadium, manganese, iron, bismuth, cobalt, zinc, and the alkaline earth metals.

European Patent Application No. 0,508,513, to General Motors Corporation, shows use of a Y-type zeolite supported on a ceramic or a metal monolith. The monolith is used in treating diesel fueled engine exhaust.

EPO No. 0,160,482, to Engelhard Corporation, shows a self-cleaning diesel exhaust particulate filter having as its oxidic catalyst mixture, a platinum group metal and an alkaline earth metal. Oxidation temperatures in the neighborhood of 350° C. appear to have been achieved using such technology.

EPO No. 0,600,442, to Nippon Shokuvai Company, utilizes iron as the active catalytic component in a diesel engine exhaust gas purification catalyst.

EPO No. 0,658,369 utilizes a diesel exhaust trap utilizing an oxidizing catalyst made up of platinum, rhodium, copper or vanadium oxide, composite oxides such as perovskites such as $LaMnO_3$ and $LaCrO_3$, a part of which may be replaced with alkali metals or alkaline earth metals such as strontium, potassium, or lithium. The examples showed initial oxidation temperatures (for carbon particulates) to be from about 280° to 427° C.

EPO No. 0,092,023, owned by the Bridgestone Tire Company shows a diesel exhaust trap having an oxidation catalyst of metallic copper or copper compound, metallic molybdenum, metallic vanadium, a molybdenum or vanadium compound, and an alkali metal compound. The catalytic material is preferably placed on a carrier of titania, γ-alumina, or silica-alumina. It is preferably used with a metallic platinum, palladium, or rhodium component for enhanced catalytic activity.

None of these patents and documents show the invention as described and claimed below.

SUMMARY OF THE INVENTION

This invention is a process for treating hot exhaust containing diesel soot and other unburned hydrocarbons from an internal combustion diesel engine. The process includes the step of contacting the exhaust, preferably in an exhaust line or manifold near the exhaust ports of the diesel engine, with a catalytic composite acting both as a particulate filter and as an oxidation catalyst for the diesel soot.

The invention also includes the particulate filter constructed of porous or refractory inorganic oxide support, possibly treated to be sulfur resistant. The refractory inorganic oxide may be selected from the group consisting of alumina, titania, zirconia, boria, corundum, silica, magnesia, potassium titanate, silica-alumina, silica-zirconia, titania-zirconia, titania-silica, and alumina-thoria-titania, silica-alumina, titania-coated alumina, alumina coated with tungsten oxide, alumina coated with zirconia, and mixtures and combinations thereof. The catalytically active particles comprise a Group IB metal (Au, Ag, and Cu; Preferably Cu) promoted by a an Iron Group VIII metal (Co, Ni, and Fe; preferably Fe). These materials are first mixed as a weakly acidic aqueous solution preferably using an organic acid such as acetic, propionic, oxalic, or butyric acid. An alkali metal salt of the chosen acid is then added. A Group VB metal salt (V, Nb, and Ta; preferably V) is then added to the solution. It is believed that the Group IB/Group VIII metals form an intimate mixture or complex ion which is preserved upon precipitation of the mixture using at least a moderate base, e.g., a slurry or suspension of an alkaline earth metal oxide or hydroxide, preferably $Ca(OH)_2$. The resulting particles include, often, a core of the resulting alkaline earth metal salt. This mixture is then applied to a support and dried to form a composite.

The composite of this invention is self-regenerating. It has a "light-off" or initial oxidation temperature within the range of those temperatures usually found within the exhaust gas of a diesel engine.

BRIEF DESCRIPTION OF THE DRAWINGS

FIGS. 2A–2E show end views of a variety of catalytic supports suitable for use in this invention.

DESCRIPTION OF THE INVENTION

Figure 1:
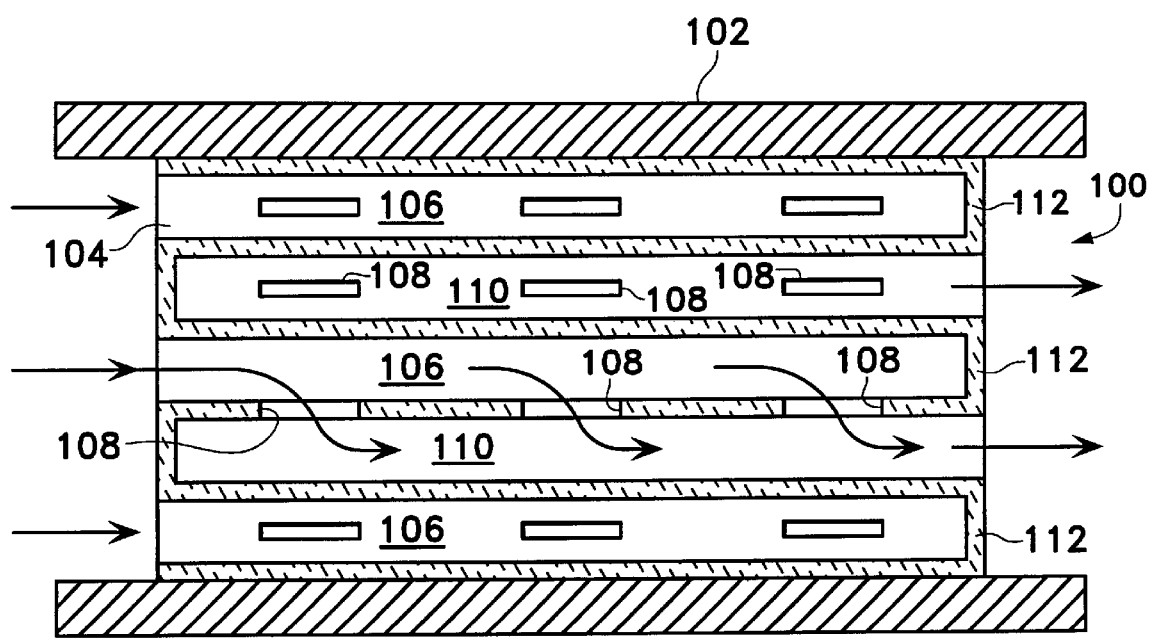
FIG. 1 shows a generic soot filter, catalytic support suitable for use in this invention.

This invention relates to a particulate filter composite for use in a diesel exhaust. The filter composite includes a specific catalyst suitable for oxidizing the soot caught in that particulate filter. As noted above, this invention also includes a process for reducing the amount of diesel soot in the hot exhaust of a diesel engine. This catalyst composition provides several advantages. First and foremost, it is able to oxidize the soot and other hydrocarbonaceous materials found in the exhaust gas of a diesel engine at the temperatures normally found in the engine's exhaust manifold. Another advantage is that the catalyst is both sulfur-resistant and does not oxidize the sulfur dioxide found in diesel exhaust to sulfur trioxide in any appreciable way.

The form of the particulate filter is such that it will allow exhaust gas to exit the engine without substantial back pressure, even if partially filled with soot, and yet be sufficiently convoluted that the soot not leave the filter.

Catalytic Material

The material used as the oxidation catalyst in this invention is produced using a relatively complicated procedure but is effective in producing a self-regenerating catalytic composition having a low light-off temperature.

The composition is formed preferably by the production of a wash coat or slurry of catalytically active particles which is further used at least partially to coat the catalyst support discussed below. My procedure for making the catalytic composition follows. The catalytically active particles comprise a Group IB metal (Au, Ag, and Cu; preferably Cu) promoted by an iron group—Group VIII metal (Co, Ni, and Fe; preferably Fe). These materials are first mixed as a weakly acidic aqueous solution preferably using an organic acid such as acetic, propionic, oxalic, malonic, formic, or butyric acid. An alkali metal salt of the chosen acid is then added. A Group VB metal salt (V, Nb, and Ta; preferably V) is then added to the solution. The Group VB metal apparently or preferably coats or partially covers the surface of the Group VIII/Group IB metal particles. The Group VB metal solution should not dissolve the Group VIII/Group IB metal particles. It is believed that the Group IB/Group VIII metals form an intimate mixture or complex ion which is preserved upon precipitation of the mixture using at least a moderate base, e.g., a slurry or suspension of an alkaline earth metal oxide or hydroxide, preferably $Ca(OH)_2$. Optionally, one or more Platinum Group metals (Ru, Rh, Pd, Re, Os, and Pt) usually in the form of a salt may be added if so desired. In any event, the resulting particles include, often, a core of the resulting alkaline earth metal salt. The slurry may then be further mixed with powdered refractory metal oxide such as listed elsewhere herein and milled. The resulting slurry may then be placed on the support discussed below. This coated support is then dried to form the inventive composite.

The relative molar amounts of Group IB, Group VIII, and Group VB metals in the finished catalyst are between 0.01:0.01:2: and 1:1:0.5:, preferably 0.5:0.4:1: to 0.8:2:2.

Catalyst Support

The physical form of the support for this composition is not a critical portion of the invention. Desirably, it is one having significant flow-through capabilities in that otherwise it will block the flow of the exhaust gas. However, it must have sufficiently convoluted passageways to cause the soot in the diesel exhaust gas to drop out of the exhaust gas stream. The support may be made up of, for instance, alumina, titania, zirconia, boria, corundum, silica, magnesia, potassium titanate, silica-alumina, silica-zirconia, titania-zirconia, titania-silica, and alumina-thoria-titania, silica-alumina, titania-coated alumina, alumina coated with tungsten oxide, alumina coated with zirconia, and mixtures and combinations thereof. It may be coated with a slurry of another refractory material produced of any of the noted materials. For instance, a slurry of alumina on a macroporous base made, perhaps of titania, produces a support which is highly sulfur resistant.

There are several known designs for such physical catalyst supports which are acceptable for placement of my catalytic composition. FIG. 1 generically shows how such a filter works. The physical catalyst support (100) is often a monolith and typically is placed in a housing (102) to protect it from ambient conditions and hold the contained exhaust gas inside.

The assembly shown in FIG. 1 accepts an exhaust gas from the left of the drawing and allows it to flow through the upstream ends (104) of passageways (106). The interior walls of longitudinal passageways (106) are at least partially coated with my catalytic composition. The exhaust gas passes through the passageways (106) until encountering one or more of the openings (108) into adjacent passageways (110). Often it is the case that a portion of the inlet passageways (106) are closed (or perhaps only partially closed) using some type of a plug (112) to force the exhaust gas to flow through openings (108). The change in direction as the gas passes through openings (108) into the potentially quiescent zones in the adjacent passageways (110) will cause many of the particles to drop out of the flowing gas and rest on the catalyst-bearing walls.

This class of design is simple and doesn't easily clog in the event of catalyst maloperation.

There are a variety of channel shapes which are suitable for the physical catalyst support of my invention. FIGS. 2A–2E show the ends of a number of such shapes.

FIGS. 2A and 2B show designs which typically are extruded or cast from a refractory metal oxide or ceramic, e.g., alumina, titania, zirconia, boria, corundum, silica, magnesia, potassium titanate, silica-alumina, silica-zirconia, titania-zirconia, titania-silica, and alumina-thoria-titania, silica-alumina, titania-coated alumina, alumina coated with tungsten oxide, alumina coated with zirconia, and mixtures and combinations thereof. Obviously, the channel shape in the FIG. 2A variation (140) is approximately square. The FIG. 2B variation (143) has hexagonal channels.

FIGS. 2C–2E depict variations in which the support is metallic, often high Cr steel, steel, and aluminum coated or doped steel. Each of these is appropriately used in my catalytic converters. Metallic supports are usually coated with a washcoat of one or more of the refractory metal oxides or ceramics listed above to serve as a tie to that metallic support.

Additionally the catalytic composition of any invention may be used in the following variations.

Figure 3:
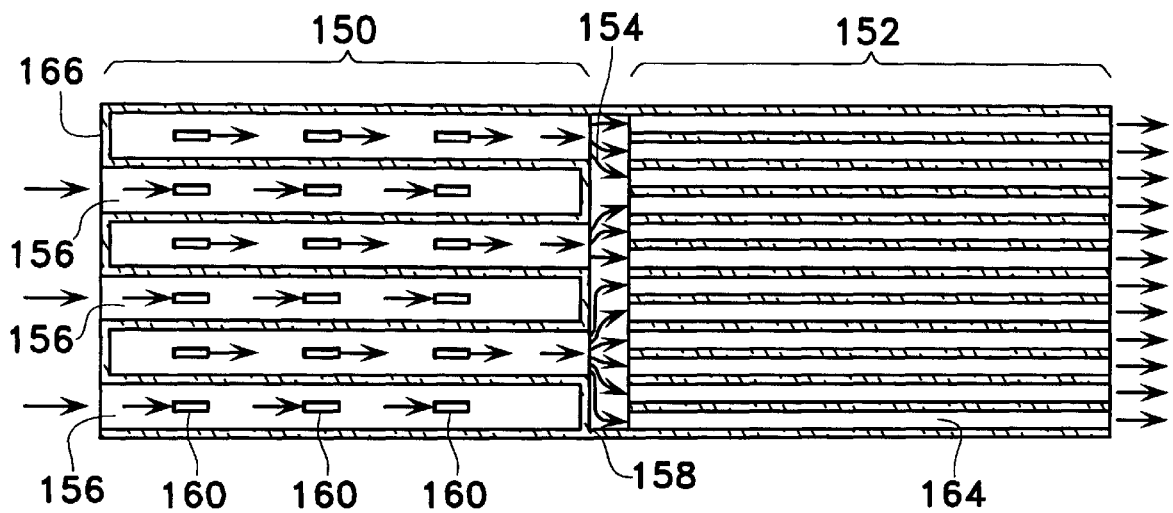
FIG. 3 shows a cutaway side view of a variation of the invention involving slow gas velocity and high gas velocity sections.

FIG. 3 depicts a variation in which the relative localized velocity of the exhaust gas is varied as it passes through the catalytic chamber and the relative "convolutedness" as the flow path is changed as well. The catalyst concentration may be varied from section to section as well. The concept is this, a first, catalytic, highly convoluted section is used to "dropout" larger carbonaceous and hydrocarbonaceous particles. The gas flow is desirably rather slow and involves switchbacks and the like to accumulate the soot on the catalyst bearing surfaces. Some amount of smaller soot particles is expected to pass through the first stage and into the relatively high specific flow second stage where a desirably higher catalyst concentration is found. The walls of the composition contact the smaller particles and oxidize them.

As an example of the concept FIG. 3 shows a first convoluted stage (150) and a second stage (152) separated in this variation by an optional pressure equalization region (154).

The convoluted region (150) is at least partially coated with a catalytic coating, as is discussed elsewhere herein. The catalyst support variation shown in FIG. 3 is a well known one in which adjacent channels through the region are configured in such a way that exhaust gas flows into a number of channels (156) which are capped or closed (at 158) at their remote ends. The exhaust gas flows, as is shown by the arrows in FIG. 3, through a number of openings (160) into adjacent channels which are closed at the upstream end (162) and open at the downstream end. The size of the channels and the change in exhaust gas flow direction between channels tends to remove the majority of soot from the flowing gas to be oxidized by the catalyst on the channel walls.

Downstream of the convoluted region (150) is a short open region (154) used generally as a flow-leveling area. That is to say that the exhaust gas exits the convoluted region (150) in a few large planes exiting the large channels and must then redistribute to enter the smaller channels (164) of the downstream region (152).

Again, it is desirable to employ a multitude of smaller channels (164) in the high flow region (152) to minimize the pressure drop across that region (152). The downstream section (152) will, with a sufficient axial length, typically oxidize the remaining smaller particles and hydrocarbonaceous material.

Figure 4:
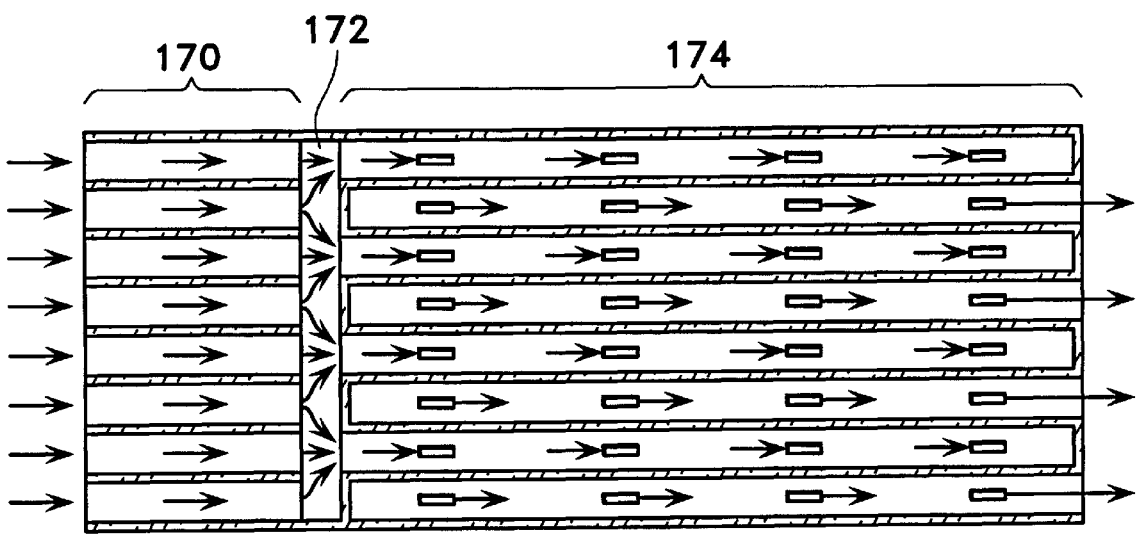
FIG. 4 shows a cutaway side view of a variation of the invention having an upstream Platinum Group catalyst section and a downstream section made according to the invention.

The variation found in FIG. 4 is one which the exhaust gas first passes through an aggressive oxidation reactor section (170), a optional pressure equalization region (172), and then into an inventive reactor section as described elsewhere herein.

In this variation, the upstream reactor section (170) contains a Platinum Group metal catalyst which will partially oxidize the diesel soot particles but will also typically oxidize the $NO_x$ (and perhaps some of the $N_2$) to $NO_2$ and often will oxidize the sulfur compounds present (e.g., $SO_2$) at least partially to $SO_3$. Since many of the Platinum group metal catalysts are so aggressive, they are often looked upon as unsuitable because of their propensity to oxidize nitrogen and sulfur compounds to their most highly oxidized and acid-forming forms.

The Platinum group metals do oxidize CO and hydrocarbonaceous and carbonaceous materials with ready ease. The use of my inventive catalyst assembly as the downstream section (174) of the variation shown in FIG. 4 resolves many of those problems in that both $NO_2$ and $SO_3$ operate as oxidants on the noted soot particles. The $NO_2$ will reduce to $N_2$ and the $SO_3$ will return to its original $SO_2$ form.

Consequently, implementation of the upstream section (170) has several benefits when used in conjunction with any downstream invention catalytic assembly (174): nitrogen compounds are reduced in large part to $N_2$, $SO_2$ is not oxidized to $SO_3$, and the overall size of the assembly shown in FIG. 4 can be minimized.

The catalytic exhaust filter is produced simply by dipping the macroporous support in a slurry or washcoat of the catalytically active material described above. The resulting dipped support is dried and, perhaps, recoated and dried as many times as is desirable to produce a composition with appropriate macro-porosity for the intended purpose.

The particular filter thus-produced is then dried in a moderate oven, e.g., at about 125° C. Calcination at a temperature between 600° and 850° C. completes production of the inventive composition.

EXAMPLES

Example 1

A first solution of 171 grams of copper sulfate and 250 grams of water was warmed. Eighty-six grams of oxalic acid was added. A second solution of 150 grams of oxalic acid, 500 ml of water, and 89 grams of ferric oxide was warmed to 48° C. and added to the first copper solution. A solution of 400 ml of water, 77 grams of potassium hydroxide, and 346 grams of oxalic acid was then added to the mixtures of copper and iron. A third solution of 750 ml of water was formed by heating the water to 40° C. and adding 250 grams of vanadium pentoxide with 520 grams oxalic acid. This third solution was added to the previously mixed solutions of copper and iron. A slurry of 63 grams of calcium hydroxide and 100 grams of water was added to the mixture while stirring.

This mixture was milled with 125 grams of anatase titania to produce the wash coat.

The milled slurry was then placed on a Coming ceramic honeycomb support by dipping the support repeatedly in the slurry prepared just above. It was then dried at 125° C. for 5 hours and calcined at 720° C. for 1 hour.

Example 2

Figure 5:
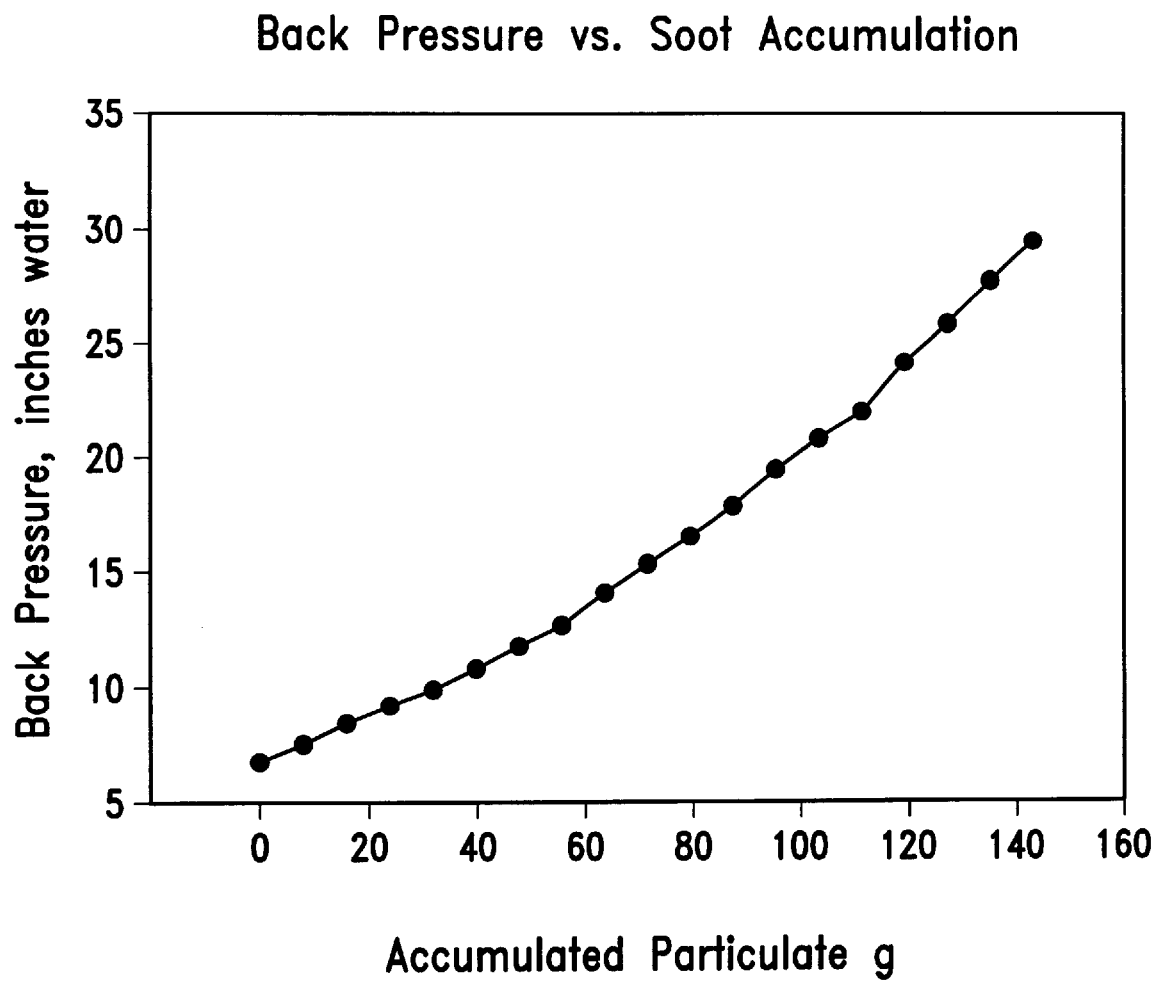
FIGS. 5 and 6 show data relating to the use of the inventive catalytic soot filter.

Two of the particulate filters of Example 1 were then placed in a laboratory engine exhaust to demonstrate the self-regenerating effect in a controlled manner. Each of the filter assemblies was 5.66 inches in diameter and 8.0 inches in length. First, the catalytic filters were loaded with soot by placing them in parallel in the exhaust line of a 50 BHP diesel engine. The exhaust back pressure was measured and the total solids accumulated in the two filters was measured and this information is shown in Table I and in FIG. 5.

TABLE I

| Back Pressure ("$H_2O$") | Solids (g) |
|---|---|
| 6.67 | 0 |
| 7.50 | 8 |
| 8.34 | 16 |
| 9.17 | 24 |
| 10.00 | 32 |
| 10.83 | 40 |
| 11.83 | 48 |
| 12.75 | 56 |
| 14.17 | 64 |
| 15.42 | 72 |
| 16.67 | 80 |
| 17.92 | 88 |
| 19.58 | 96 |
| 20.83 | 104 |
| 22.08 | 112 |
| 24.17 | 120 |
| 25.83 | 128 |
| 27.67 | 136 |
| 29.58 | 144 |

The two soot-loaded particulate filters were then placed, in parallel, in the exhaust line of propane powered internal combustion engine. This engine allowed control of exhaust line temperature as a function of engine speed without the production of additional soot. The pressure drop across the filters was recorded as a function of time as was the exhaust temperature entering the filters.

The exhaust gas temperature was initially introduced at a temperature of 350° C. and slowly increased. The change in back pressure was continually observed. A rapid decline in back pressure was observed at 380° C. and the temperature of 380° C. was maintained until the rate of change of back pressure declined. This took a period of 45 minutes.

The exhaust temperature was then increased, over a five minute period, by 20° C. to 400° C. and this temperature was maintained for 45 minutes. The rate of soot weight loss was nil. The exhaust temperature was then increased several times, over five minute periods, by 20° C. and maintained at plateaus of 420° C., 440° C., 460° C., and 480° C. for periods of 45 minutes each. The soot weight loss began again at the temperature of 440° C.

Figure 6:
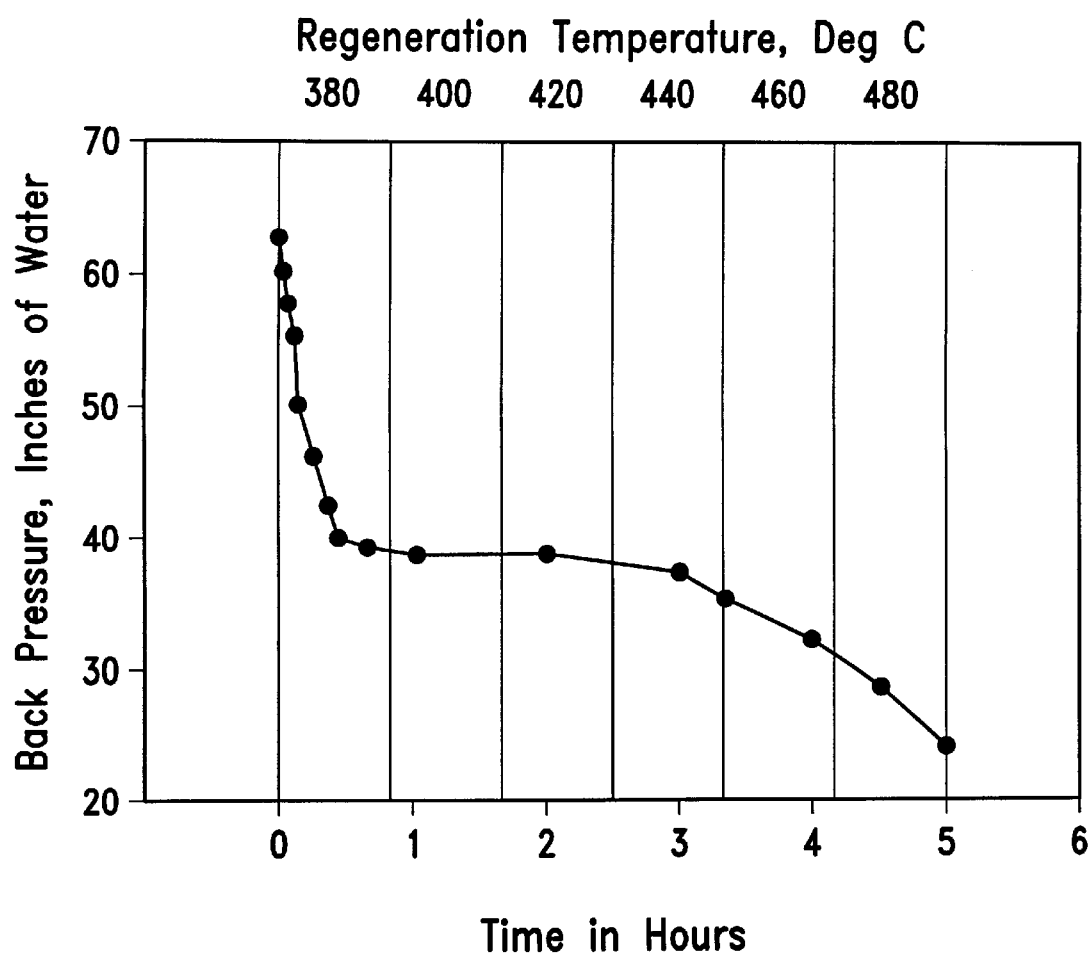

The regeneration was considered complete when a temperature of 480° C. was attained. The data are shown in Table II and in FIG. 6.

TABLE II

| Back Pressure ("H$_2$O") | Time (hr) |
|---|---|
| 62.5 | 0.00 |
| 60.0 | 0.033 |
| 57.5 | 0.067 |
| 55.0 | 0.0108 |
| 50.0 | 0.142 |
| 46.3 | 0.250 |
| 42.5 | 0.358 |
| 40.0 | 0.429 |
| 39.4 | 0.642 |
| 38.8 | 1.000 |
| 38.8 | 2.000 |
| 37.5 | 3.000 |
| 35.6 | 3.358 |
| 32.5 | 4.000 |
| 28.8 | 4.500 |
| 24.4 | 5.000 |

This test demonstrates that the catalyst composition is very active and self-regenerating at a temperature of 380° C. The initial slope shows that the particle accumulation would be nil at that temperature and at a equilibrium back pressure between 60 and 40 "H$_2$O would be achieved by an engine running with an exhaust temperature of 380° C. Higher exhaust temperatures result in a lower equilibrium back pressure.

This is believed to show that the lighter hydrocarbon fractions, perhaps adsorbed or absorbed into the soot particles, present in the diesel exhaust are oxidized at the lower temperature and tend to oxidize the soot particles as well.

Example 3

Figure 7:
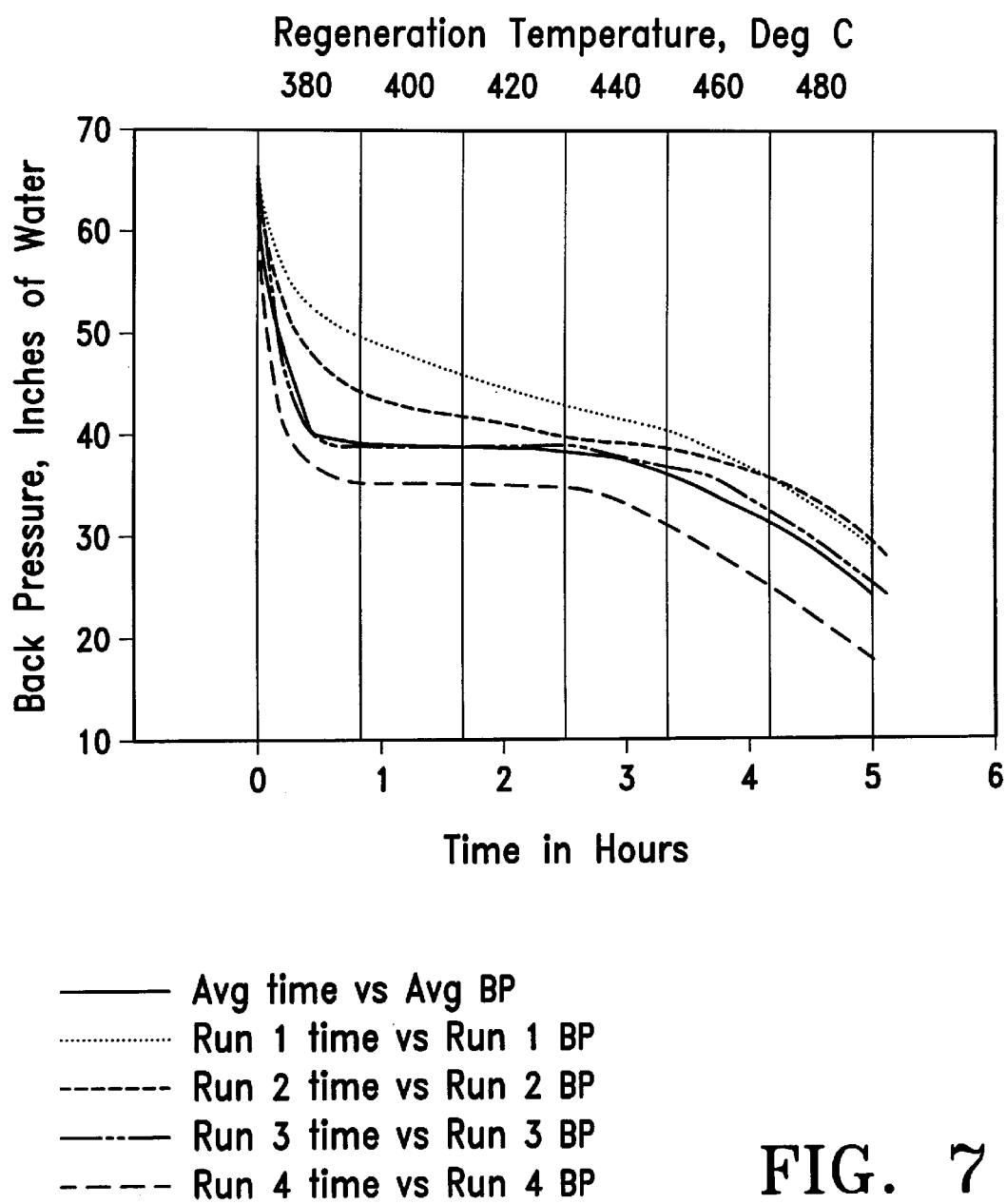
FIG. 7 show the results of multiple regeneration steps on the catalytic material shown in FIGS. 5 and 6.

The two catalytic monoliths described in the Examples above were repeatedly loaded with soot and regenerated as described in Example 2. The results of those four runs are shown in FIG. 7. The rates are quite similar in each instance.

It should be noted that the subsequent runs also started at the same back pressure thereby demonstrated that the catalyst monolith had in those prior runs been regenerated in that the soot particles were apparently gone. It should also be noted the initial slope of the line increased in the later runs. This tends to show that the catalytic activity is increasing over the number of runs observed.

I claim as my invention:

1. A low temperature diesel exhaust soot oxidation catalyst comprising:

a porous refractory metal or metal oxidic support, and a wash coat comprised of an acidic iron-containing compound, a copper-containing compound, an acidic vanadium-containing compound solution, and an alkaline earth metal compound slurry.

2. The catalyst of claim 1 wherein the porous refractory oxidic support is selected from the group consisting of alumina, titania, zirconia, boria, corundum, silica, magnesia, potassium titanate, silica-alumina, silica-zirconia, titania-zirconia, titania-silica, and alumina-thoria-titania, silica-alumina, titania-coated alumina, alumina coated with tungsten oxide, alumina coated with zirconia, and mixtures and combinations thereof.

3. The catalyst of claim 1 wherein the copper-containing compound is copper sulfate.

4. The catalyst of claim 1 wherein the iron-containing compound is an iron oxide.

5. The catalyst of claim 4 wherein the iron oxide comprises ferric oxide.

6. The catalyst of claim 1 wherein the vanadium-containing compound is vanadium pentoxide.

7. The catalyst of claim 1 further comprising one or more metals selected from the group consisting of Ru, Rh, Pd, Re, Os, and Pt.

8. The catalyst of claim 1 wherein the porous refractory metal or metal oxidic support contains multiple channels.

9. The catalyst of claim 1 wherein the porous refractory metal or metal oxidic support comprises a porous refractory metal.

10. The catalyst of claim 1 wherein the porous refractory metal of metal oxidic support comprises a porous refractory metal oxide.

* * * * *